Nov. 1, 1932.　　　　　C. H. LILLEY　　　　　1,885,611
SNOWPLOW EQUIPMENT FOR AUTOMOBILES
Filed Dec. 17, 1931　　　7 Sheets-Sheet 6
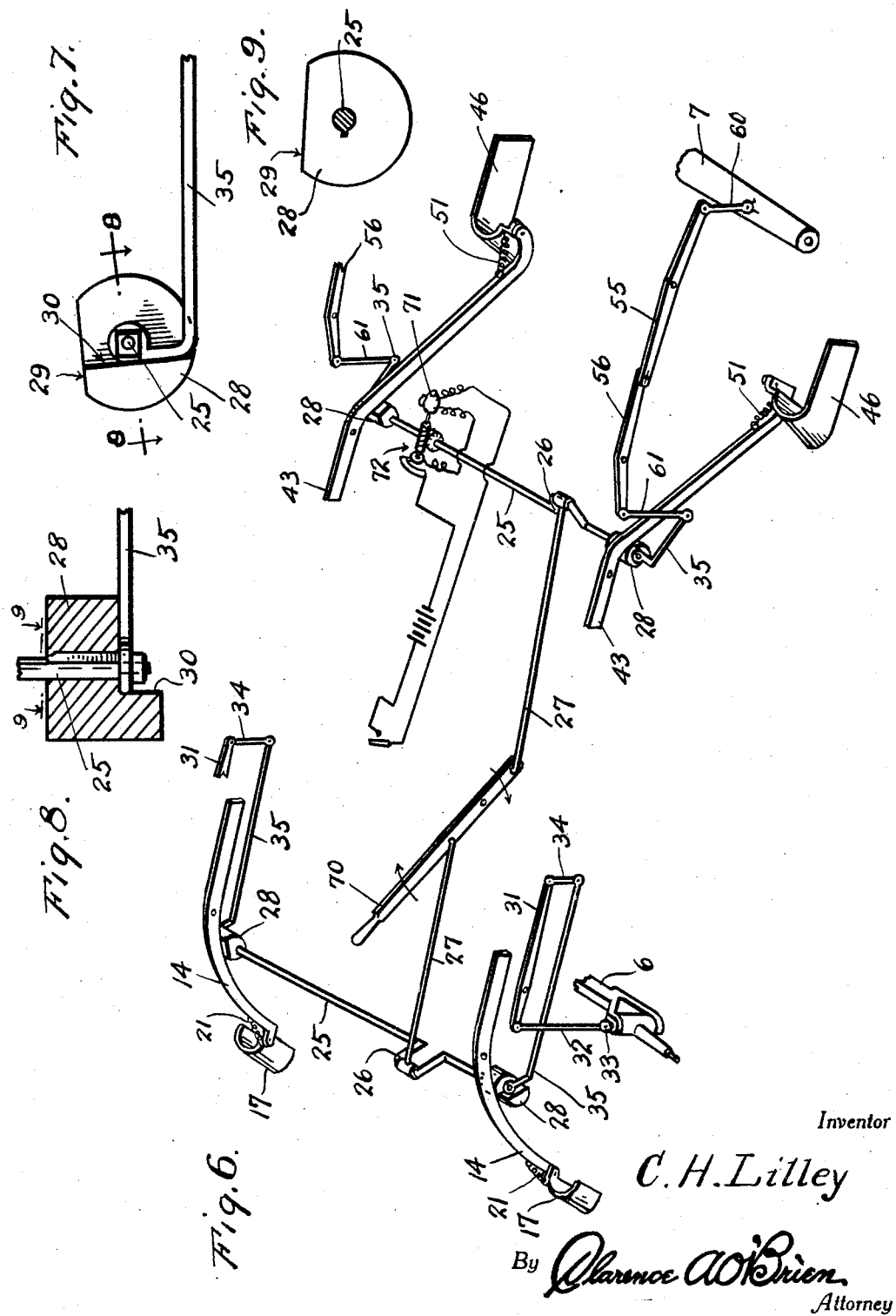
Inventor
C. H. Lilley
By Clarence A. O'Brien
Attorney

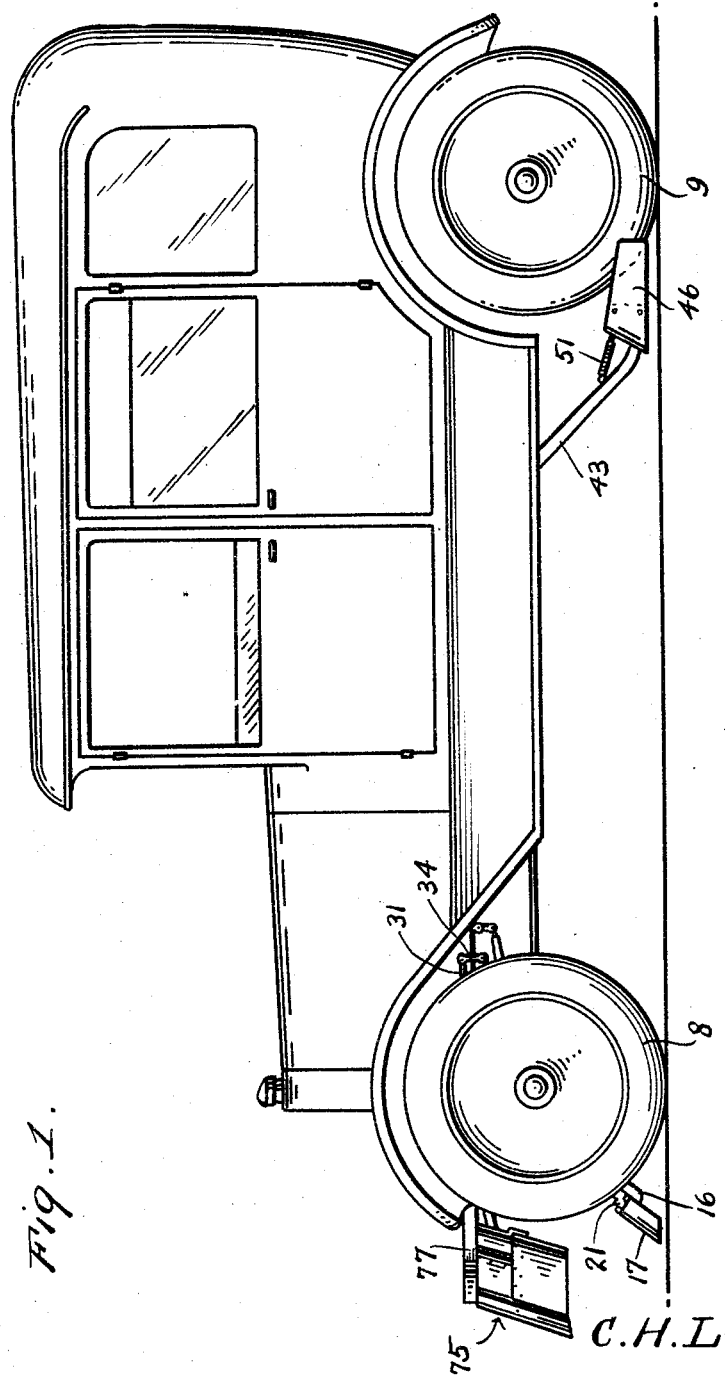

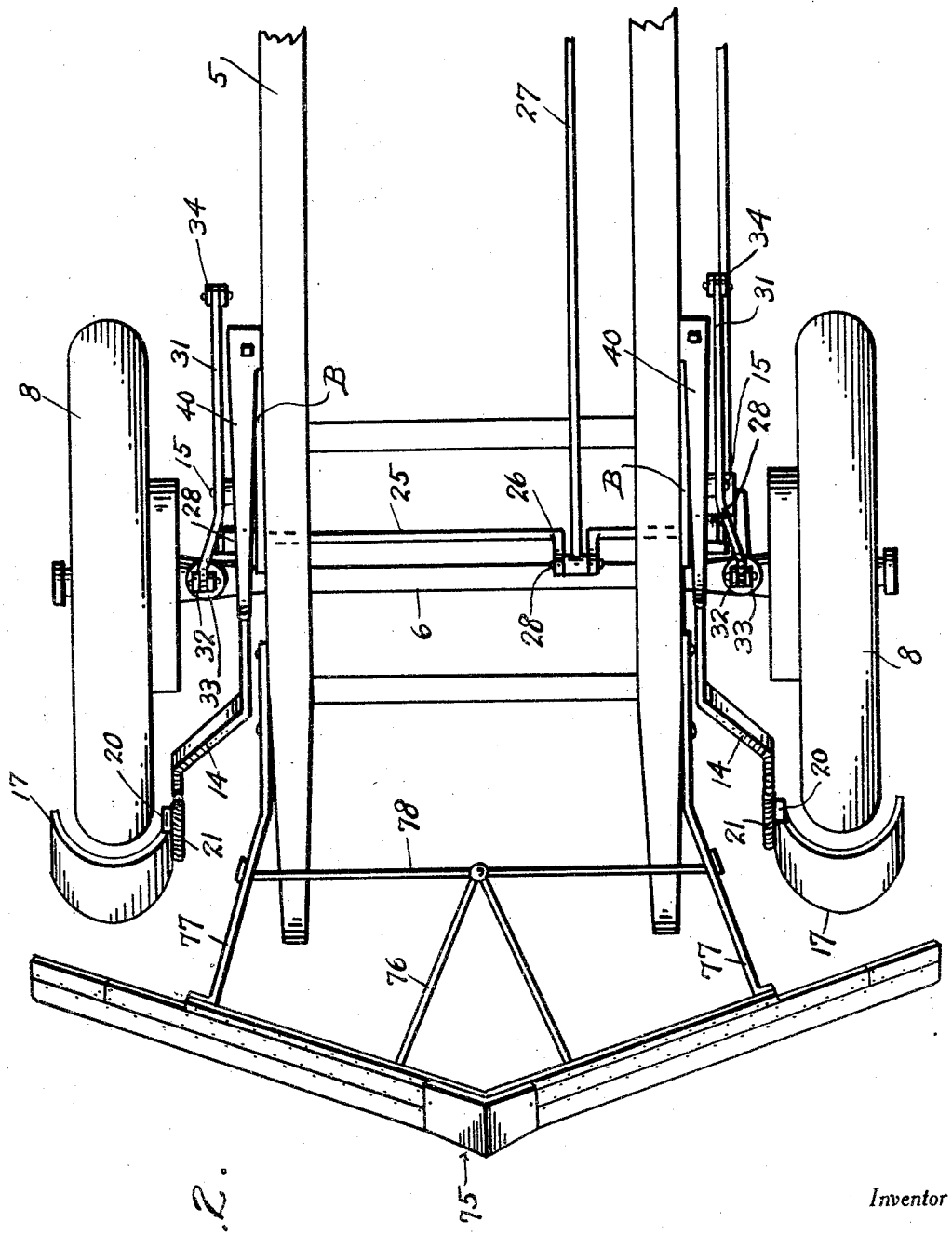

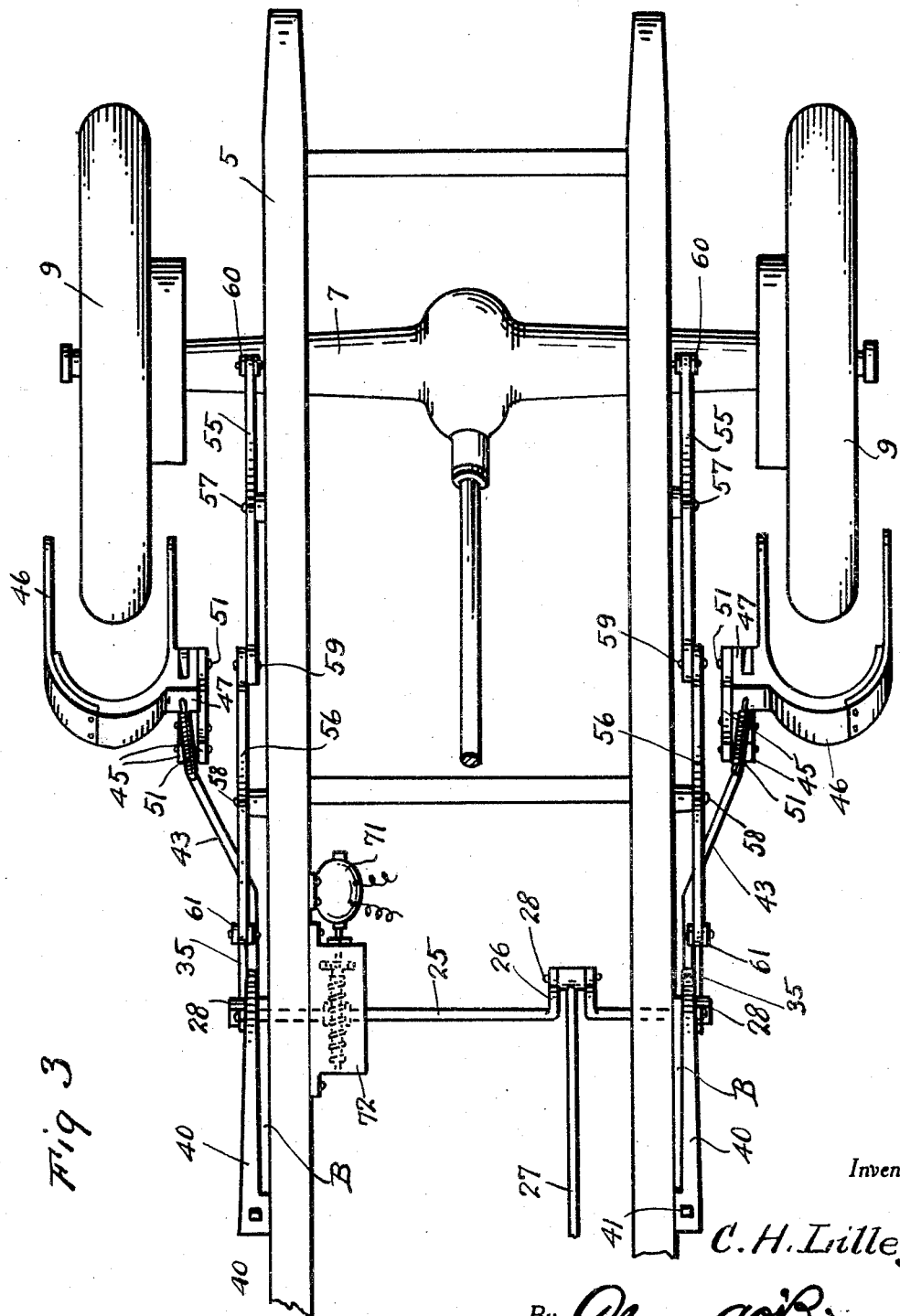

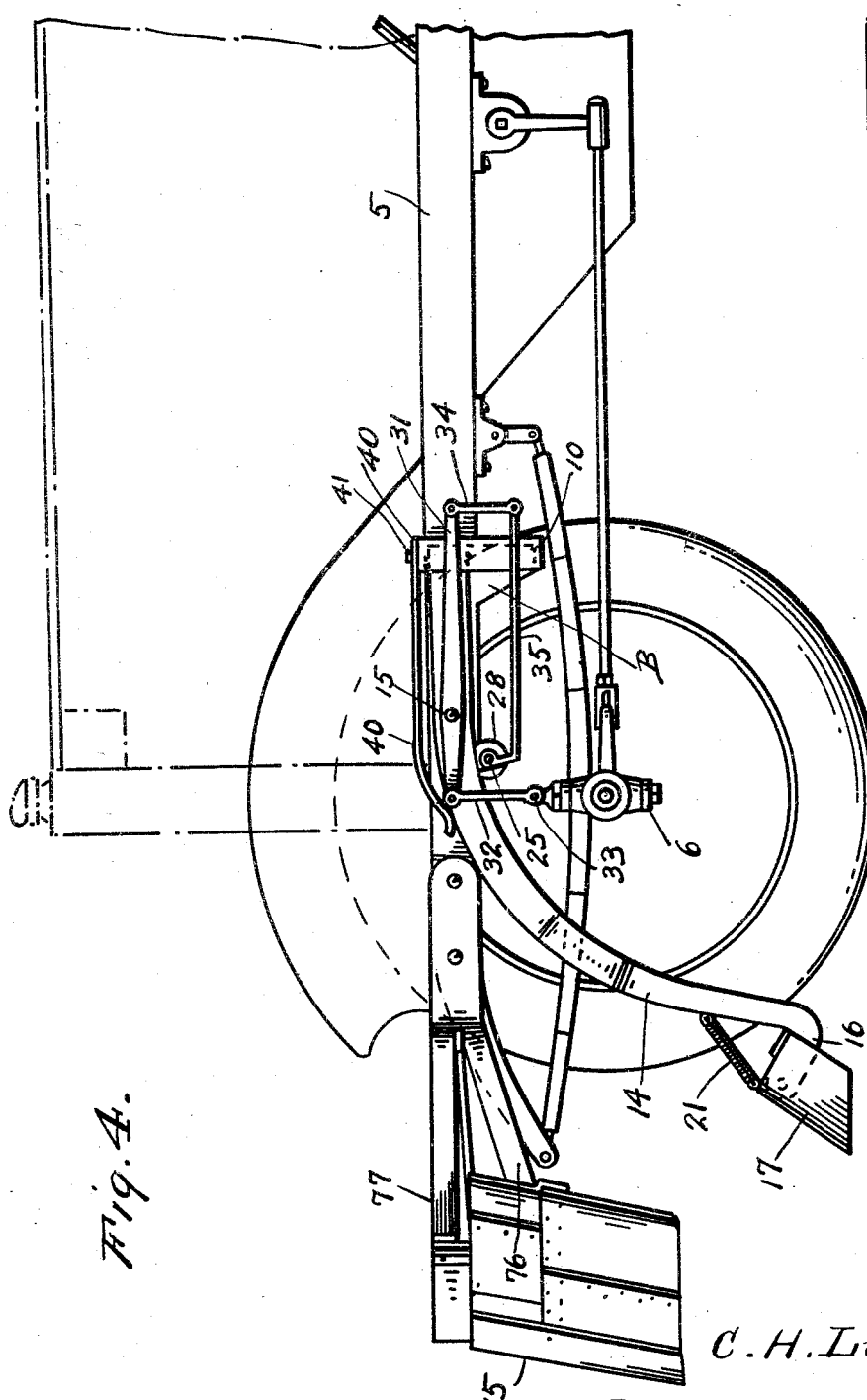

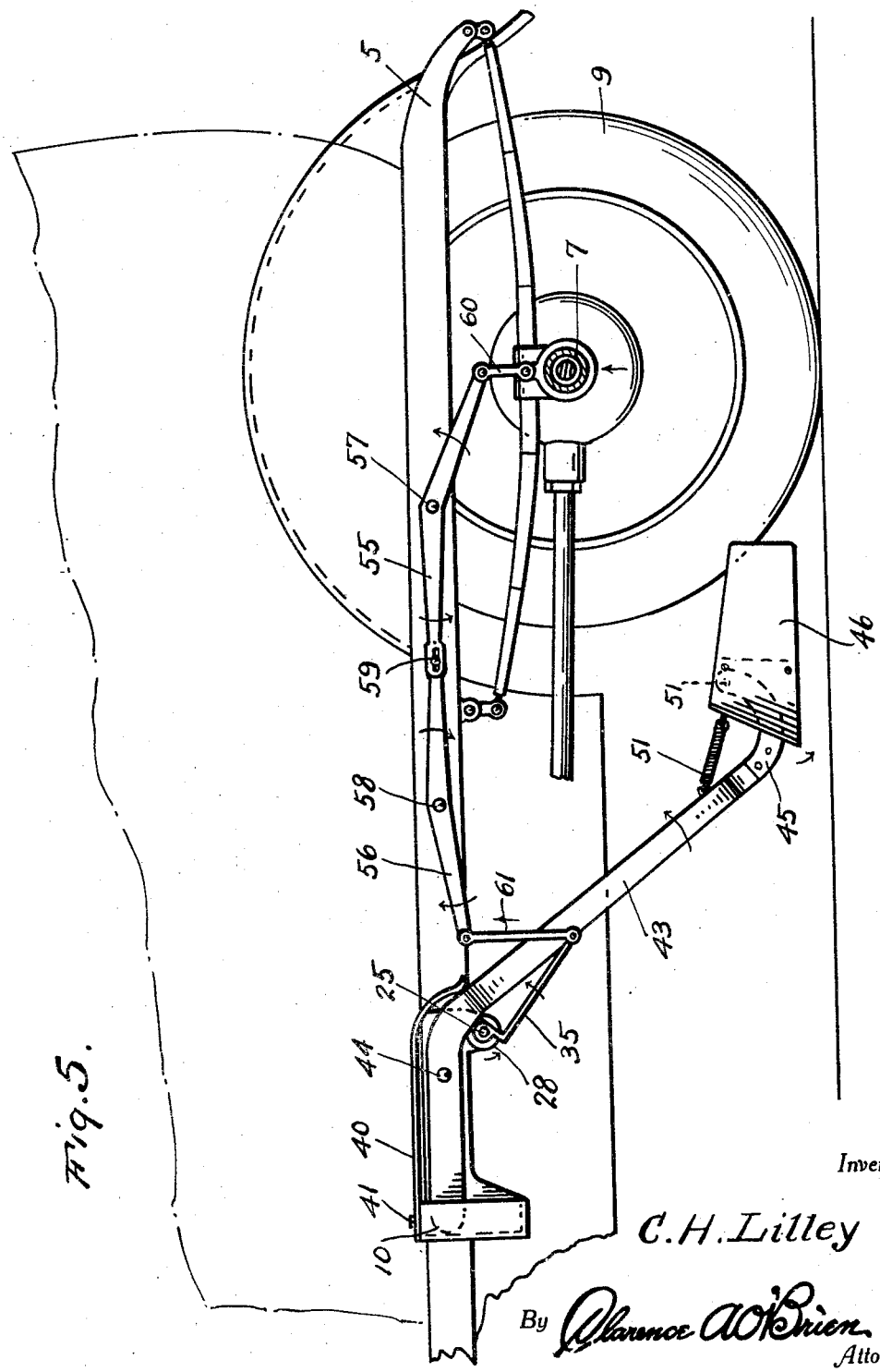

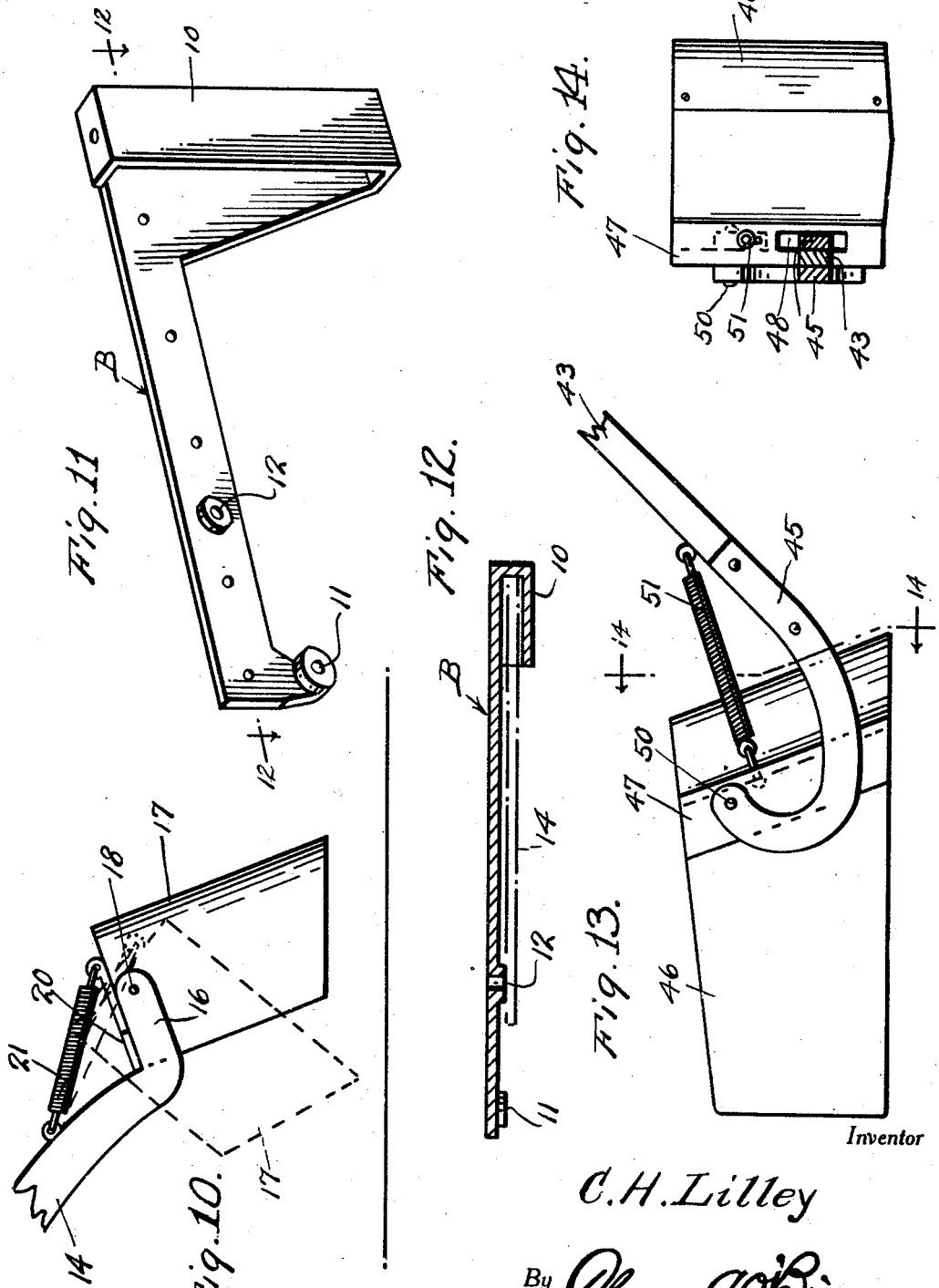

Patented Nov. 1, 1932

1,885,611

UNITED STATES PATENT OFFICE

CHARLES H. LILLEY, OF NEWBURGH, NEW YORK

SNOWPLOW EQUIPMENT FOR AUTOMOBILES

Application filed December 17, 1931. Serial No. 581,700.

The present invention relates to snow plow equipments for automobiles and the like and has for its prime object to provide means on an automobile and the like to clear the snow sufficiently for free travel of the automobile.

Another very important object of the invention resides in the provision of equipment of this nature for clearing the snow away sufficiently so that the axles of the vehicle may pass freely thereover and specific means being provided to clear the snow for the wheels.

A further important object of the invention resides in the provision of individual snow plow units for the wheels of the automobile and means for holding said units in proper position with respect to the wheel and having associated therewith a mechanism to compensate for the movement of the body of the automobile with respect to the axles and wheels.

A still further very important object of the invention resides in the provision of equipment of this nature which is strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of an automobile with my equipment thereon.

Figure 2 is a top plan view of the forward portion of the equipment, the body of the automobile being removed.

Figure 3 is a similar top plan view of the rear portion thereof.

Figure 4 is a side elevation of the front portion of the equipment.

Figure 5 is a side elevation of the rear portion of the equipment.

Figure 6 is a perspective view of the equipment shown in a somewhat diagrammatic manner.

Figure 7 is a detail side elevation of one of the cams.

Figure 8 is a sectional view therethrough taken substantially on the line 8—8 of Figure 7.

Figure 9 is a sectional view taken substantially on the line 9—9 of Figure 8.

Figure 10 is an enlarged side elevation of one of the front plows, looking at the inner side thereof.

Figure 11 is a perspective view of one of the four supporting brackets.

Figure 12 is a horizontal section therethrough taken substantially on the line 12—12 of Figure 11.

Figure 13 is an inner side elevation of one of the rear plows, and

Figure 14 is a sectional view taken on the line 14—14 of Figure 13.

Referring to the drawings in detail it will be seen that numeral 5 denotes the frame of an automobile or the like supported on front and rear axle structures 6 and 7 respectively by the usual springs. Numerals 8 denote the front wheels and numerals 9 the rear wheels. All of these parts are conventional and have been illustrated and described merely to bring out hereinafter the relationship of the equipment therewith. There are four brackets B mounted on the sides of the frame 5, a pair just forwardly of the rear wheels and a pair to the inner sides of the front wheels rearwardly of the front axle. Numerals 10 denote vertical guides and numerals 11 and 12 denote bearings of the brackets. The brackets are bolted or otherwise securely fastened to the frame.

Particular attention is now directed to Figures 2 and 4 and it will be noted that elongated curved arms 14 are pivoted as at 15 adjacent their upper ends, each upper end being movable in the guide 10 of the adjacent bracket in which the pivot 15 is mounted, the bearing 12 being provided for this surface. The lower forward end of each arm 14 is offset forwardly as is indicated at 16 (see Figure 10 for instance) and a plow or shoe 17 is rockably mounted as at 18 on this end 16. I am describing the arm 14 and associated parts in the singular but it is to be understood that there is a set of these elements for each front wheel.

The shoe is curved transversely as clearly illustrated in Figure 2 and has a bracket 20 fixed thereto a portion of which is normally held in abutment with the end 16 by means of a spring 21 engaged with the bracket and with an adjacent portion of the arm 14. Now by referring to Figure 10 it will be seen that should this shoe or plow hit a stone or some other obstacle it will yield to the dotted line position shown in Figure 10 thereby preventing injury to the plow or part associated therewith. The spring 21, of course, will be strong enough to permit the plow to readily plow through the snow to clear the way for the front wheel to the rear thereof.

A shaft 25 is journalled through bearings 11 of the front brackets B and is provided with a crank 26 with which is connected a link rod 27 by means of a pin 28. On the ends of this shaft 25 are cams 28 having flat portions 29 on their periphery and formed on their outer faces with shoulders 30. The arms 14 rest on the flattened faces 29 when in normal operating position. By turning the cams through rocking of the shaft 25, the shaft being keyed thereto as shown in Figures 8 and 9, it will be seen that the arms 14 may be swung upwardly to what I term an out of the way position.

I shall now describe in detail some of the compensating mechanisms associated with one of the arms 14. Each mechanism includes a rocker arm 31 pivoted intermediate its ends on the pivot 15 and having its front end connected with the link 32 which is anchored on the front axle structure in any suitable manner such as on one of the spindle pins as is indicated at 33. A link 34 is pivotally engaged with the rear end of the arm 31 and is pivotally engaged with a rod 35 which is directed forwardly and has an offset upwardly extending end 36 with an eye circumjacent one end of the adjacent shaft 25 and this offset end 36 is normally in abutment with the shoulder 30.

Now it will be seen that should the axle structure move close to the frame because of the wheel going over a bump or the like it will cause the rocking of the arm 31 and therefore cause the rocking of the rod 35 which abutting the shoulder 30 will cause the rocking of the cam 28 so as to lift the arm 14 and prevent the shoe or plow on the end thereof from digging into the ground or the like.

Springs 40 are mounted on the brackets B and are anchored as at 41 and have free ends bearing against the arms 14 to hold them downwardly against the cams.

Attention is now directed particularly to Figures 3 and 5. Numerals 43 denote the two rear arms which are pivoted as at 44 on the rear brackets B and have their forward free ends in the guides 10 of said brackets. The levers incline downwardly and rearwardly and terminate in rearwardly and upwardly curved fork sections 45. Numerals 46 denote curved plows or shoes located in front of the rear wheels 7 and formed with enlargements 47 on their inner sides provided with slots or openings 48. One of the fork elements 45 is pivoted in the opening and the other to the outside of the enlargement 47 as indicated at 50.

Springs 51 engaged with the shoes 46 and the arms 43 hold the shoes as illustrated to advantage in Figure 13 so that they may yield rearwardly to pass over an obstacle with which they might come in contact. A shaft 25, similar to the previously described shaft 25, is journalled in the bearings 11 of the rear brackets B and is provided with a crank 26 and with cams 28.

Compensating mechanisms are associated with the arms 43 and each comprises a pair of rocker arms 55 and 56 pivoted as at 57 and 58 respectively on the frame 5. Adjacent ends of the rocker arms have pin and slot connections 59. The rear end of the rocker 55 is connected to the rear axle assembly by a link 60. A link 61 is connected to the forward end or free end of the rocker 56 and engages a rod 35 similar to the previously described rod 35 and cooperating with cams 28 and shaft 25 as previously explained. A further detail description of this mechanism is deemed unnecessary and it operates and functions in the same manner as the other compensating mechanisms described more in detail.

The rear shaft 25 has its crank connected with another link rod 27. These link rods 27 are connected with a hand lever 70 at opposite sides of its fulcrum as is indicated diametrically in Figure 6. Numeral 71 denotes an electric motor having an operative connection 72 with the rear shaft 25 so that the motor 71 may be energized to rock the shaft rather than use the hand lever.

Numeral 75 denotes a plow across the front of the vehicle mounted on suitable brackets 76 and 77 connected together by cross bar 78. This plow 75 may be made in a plurality of sections bolted or otherwise secured together in order to be readily disassembled when desired.

This plow 75 terminates a little below the front of the axle structure so as to clear the snow away sufficiently deep to provide clearance for the axle structures of the vehicle.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with a vehicle; wherein the vehicle includes a frame, axle structures on which the frame is mounted, and wheels on the axle structures; of an equipment including a plow mounted on the front of the frame extending a distance slightly below the front axle structure said plow extending across the front of the vehicle and sloping from its middle to each end, and a plurality of plows one in front of each wheel, and means for supporting the last mentioned plows from the frame.

2. In combination with a vehicle; wherein the vehicle includes a frame, axle structures on which the frame is mounted, and wheels on the axle structures; of an equipment including a plow mounted on the front of the frame extending a distance slightly below the front axle structure said plow extending across the front of the vehicle and beyond the front wheels and sloping from the center to each end thereof, and a plurality of small plows one in front of each wheel, and means for supporting the small plows from the frame, and means whereby the small plows may be lifted to out of the way positions.

3. In combination with a vehicle including a frame, an axle structure, a spring between the frame and the axle structure, and a wheel; of a plow in front of the wheel, an arm, means for pivotally mounting the arm on the frame, said plow being located on the lower end of said arm and a compensating device associated with the arm to maintain the plow in the relatively same position with respect to the wheel regardless of the movement of the axle structure with respect to the frame caused by the flexing of the spring.

4. In combination with a vehicle including a frame, an axle structure, a spring between the frame and the axle structure, and a wheel; of a plow in front of the wheel, an arm, means for pivotally mounting the arm on the frame, said plow being located on the lower end of said arm, and a compensating device associated with the arm to maintain the plow in the relatively same position with respect to the wheel regardless of the movement of the axle structure with respect to the frame caused by the flexing of the spring comprising, a rocker rockable intermediate its ends on the pivot of said arm, means for anchoring one end of the rocker to the axle structure, a shaft, a cam on the shaft having a flattened portion on which normally rests the arm, said cam having a shoulder, a rod having an offset end rockable on the shaft and engaged with the shoulder, and a link connecting the rod with the rocker.

5. In combination with a vehicle including a frame, an axle structure, a spring between the frame and the axle structure, and a wheel; of a plow in front of the wheel, an arm, means for pivotally mounting the arm on the frame, said plow being located on the lower end of said arm, and a compensating device associated with the arm to maintain the plow in the relatively same position with respect to the wheel regardless of the movement of the axle structure with respect to the frame caused by the flexing of the spring comprising, rockers disposed in extension of each other and pivoted intermediate their ends to the frame and having adjacent ends provided with pin and slot connections, means for connecting the free end of one rocker with the axle structure, a shaft rockable on the frame and having a cam with a flat portion against which normally rests the arm, a shoulder on the cam, a rod having an offset end rockable on the shaft and in abutment with the shoulder, and a link between the rods and the free end of the other rocker.

In testimony whereof I affix my signature.

CHARLES H. LILLEY.